Nov. 20, 1934.  E. J. W. RAGSDALE  1,981,633
VEHICLE DEVICE
Filed July 7, 1932
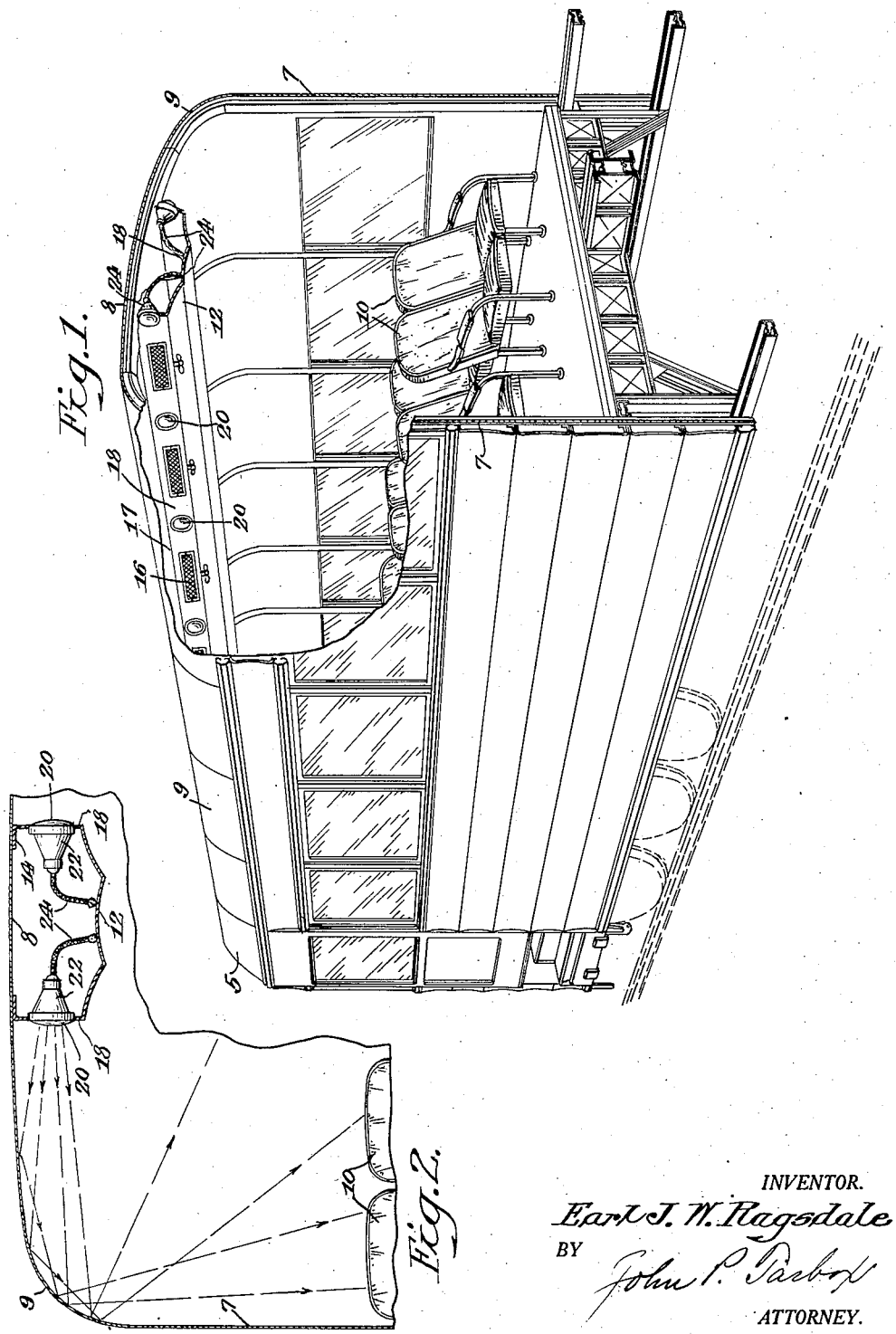
INVENTOR.
Earl J. W. Ragsdale
BY
John P. Tarbox
ATTORNEY.

Patented Nov. 20, 1934

1,981,633

UNITED STATES PATENT OFFICE 1,981,633

VEHICLE DEVICE

Earl J. W. Ragsdale, Norristown, Pa., assignor to Edward G. Budd Manufacturing Company, Philadelphia, Pa., a corporation of Pennsylvania Application July 7, 1932, Serial No. 621,317

4 Claims. (Cl. 240—9)

My invention relates to vehicle devices and particularly to illuminating and ventilating means for relatively long car bodies, as in buses, street cars and railway passenger vehicles.

A primary object of my invention is to provide a soft, evenly-distributed, or diffused, light which shall be easy on the eyes of the passengers and, at the same time, afford sufficient light for all ordinary purposes.

Another object of my invention is to facilitate the original installation, and subsequent renewal and repair, of the elements of lighting system for vehicles of the above-described character.

Another object of my invention is to provide a novel combined lighting and ventilating system, whereby to render the structure compact in construction, and ornate in appearance.

A further object of my invention is to provide a device of the above-indicated character that shall be simple and durable in construction, economical to manufacture, and effective in its operation.

A particular application of the invention is in a light-weight passenger rail car, constructed substantially entirely of relatively thin-gauge sheet metal, that is supported on pneumatic tires, and is extremely quiet in operation.

My invention, although fully adapted for other service, adds to such car, a means providing effective ventilation, under all temperature and weather conditions, and a system of illumination which is soft and, at the same time, adequate.

It comprises, in general, a duct or receptacle, preferably constructed of light-weight thin-gauge sheet steel of ornate contour, that depends from the ceiling and extends therealong, substantially mid-way between the side walls of the car.

This duct is provided, along the side walls thereof, with spaced alternate ventilating and illuminating openings, in a general perpendicular plane. The ceiling and side walls of the car are joined by edge walls of substantial radius, in section, whereby to receive the transversely-directed light from lamps, in the above-mentioned duct to deflect it downwardly, at a multiplicity of angles. The light, although slightly more concentrated, over the positions of the car seats therebelow, to provide more light, at these positions, for reading purposes, is very widely diffused, in general, to give a soft, even effect.

This result is obtained by having the lamps disposed in the duct, with reflectors behind the lamp openings therein, for definitely directing the light laterally of the vehicle, and by the use of lenses that are substantially flush with the perpendicular side walls of the duct. The wiring system for the lamps extends along the interior of the duct, thereby precluding the necessity for a separate duct or ducts for this purpose, and providing access thereto through the ventilating openings.

The entire combined illuminating and ventilating structure consists of very few parts of light-weight and compact character, and is conducive to ready manufacture along ornate lines, in keeping with the remainder of the vehicle.

Figure 1, of the accompanying drawing, is a perspective view of a rear compartment of a vehicle embodying my invention, and Fig. 2 is an enlarged detail view, in transverse section, of a portion of the structure shown in Fig. 1.

A vehicle 5 comprises side walls 7, a ceiling 8 and longitudinal edge walls 9 of relatively great radii, in section, joining the walls 7 and 8. Seats 10 are disposed in pairs at opposite sides of a center aisle, as in usual practice, thus placing the seats substantially perpendicularly opposite the curved inner surfaces of the edge walls 9.

A duct 12, preferably of relatively thin sheet metal and of any suitable section contour, is preferably of substantially channel section, having inturned upper edges 14, as shown in Fig. 2, secured against the ceiling 8.

Ventilating and lamp openings 16 and 17, respectively, are disposed, in alternate spaced relation, along each substantially perpendicular side wall 18 of the duct 12; the ventilating openings being of any suitable character and contour, usual in such practice, provided with removable gratings and, if desired, being equipped with adjusting means for controlling the flow of air.

The lamp openings 17 are provided with removable lenses 20, substantially flush with the walls 18, behind which are disposed reflectors 22, in which lamps are disposed, and from which the lamp-conducting leads, or wiring system 24, extend into the duct 12. The leads 24 extend to a suitable switch or panel board and are connected to an energy source, for controlling the operation of the lamps.

In operation, the lamps direct their light, laterally of the vehicle, through the lamp openings 17 and the lenses 20, towards the inner surfaces of the edge walls 9 and, since the light rays strike the curved wall surfaces at a multiplicity of transversely offset positions, they are directed downwardly therefrom at various angles, so that, although the light is slightly more intense at positions adjacent to the seats 10, it is nevertheless very evenly diffused throughout the interior of the car.

Direct light does not readily strike the eye of anybody in the car, either sitting or standing, and the results are more pleasing and effective than in any other lighting system, in a vehicle of similar character, of which I am aware.

While I have shown and described a particular form of my invention, changes may be effected therein without departing from the spirit and scope thereof, as set forth in the appended claims.

What I claim is:

1. In combination, in a combined car-lighting and ventilating system, ceiling and side walls joined by a longitudinal edge wall sloping in section relative thereto, a ventilating duct depending from the ceiling, a lamp supported by the duct and means for directing substantially all its light transversely to the perpendicular against said sloping edge wall for downward deflection thereby, and conducting leads for the lamp disposed in the duct.

2. In combination, in a combined car-lighting and ventilating system, ceiling and side walls joined by a longitudinal edge wall sloping in section relative thereto, a ventilating duct depending from the ceiling, and extending therealong, lamps disposed in the duct and means for directing substantially all their light transversely to the perpendicular through openings in the duct against said sloping edge wall for downward deflection thereby, and conducting leads for the lamps disposed in the duct.

3. In combination, in a car-lighting system, a ceiling and side walls and curved wall portions interconnecting the ceiling and side walls, a hollow receptacle depending from the ceiling between said walls having side-wall openings facing said side walls, lenses in said receptacle side-wall openings substantially flush with the receptacle side walls, and lamps in the receptacle and means for directing substantially all their light oppositely through said lenses toward said curved wall portions for downward deflection thereby.

4. In combination, in a combined car-lighting and ventilating system, a car including top and side walls joined by curved edge walls of substantial section radius, a duct extending substantially along the center of the top wall having side walls depending substantial distances therefrom, said side-duct walls each having alternate ventilating and lamp openings spaced therealong, lamps including reflectors in said duct and lenses substantially flush with said duct-side walls in said lamp openings for directing substantially all their light laterally against said edge walls and deflecting it downwardly therefrom, and conducting leads for the lamps disposed in the duct.

EARL J. W. RAGSDALE.